3,043,824
HYDROPEROXIDE AND SULFOXIDE COMPOUNDS
Alexis A. Oswald, Charles B. Rupar, and Sydney H. J. Greenwood, Sarnia, Ontario, Canada, assignors to Esso Research and Engineering Company, a corporation of Delaware
No Drawing. Filed Sept. 28, 1959, Ser. No. 842,582
11 Claims. (Cl. 260—93.5)

The present invention relates to a new and useful class of organic compounds from the co-oxidation of mercaptans with olefins or diolefins.

More particularly, the invention teaches the formation of organic hydroperoxides and hydroxysulfoxides; the preparation of new and useful compound therefrom, including surface-active agents; their use in stabilizing petroleum fractions, and as polymerization catalysts; and other uses as herein described.

The mercaptans which may be used in this invention include aromatic mercaptans and aliphatic mercaptans and their derivatives. Examples of these compounds are 2-naphthalene thiol, 4-chlorothiophenol, and n-dodecyl mercaptan. The olefins which may be co-oxidized with these compounds include aliphatic olefins such as n-octadecene-1, and cyclic olefins such as cyclohexene and indene. The diolefins which may be co-oxidized with the above mercaptans include both aliphatic and cyclic conjugated dienes, such as butadiene, piperylene and cyclopentadiene and aliphatic and cyclic dienes with isolated double bonds, such as 1,5-hexadiene, dicyclopentadiene.

The oxygen necessary to these co-oxidation reactions may be supplied as a pure gas or liquid; molecular oxygen in mixture with other gases, e.g. air, may also be used. In the co-oxidation of the mercaptans with olefins, the following reaction mechanism is suggested.

R—S—H+CR$_2'$=CR$_2''$+O$_2$→R—S—CR$_2'$—CR$_2''$—O$_2$H→R—SO—CR$_2'$—CR$_2''$—OH where the R groups are as herein defined. The first reaction product represents an organic hydroperoxide, while the second product is an organic hydroxysulfoxide. Although co-oxidation reactions can be carried out with three components, i.e. mercaptans, olefins, and oxygen alone, it is generally preferable to use a solvent. If isolation of the final product is desirable, it is, of course, advisable to choose a solvent in which the starting compounds are more soluble than the reaction products.

The molar ratios of the reactants mercaptan, olefins, oxygen, that can be used may vary considerably. The mercaptan-olefin ratio is between 0.001–5. For the preparation of hydroperoxides and hydroxysulfoxides as chemical products ratios close to equimolar are preferred. Such a preferred ratio is between 0.5–2. The ratio of oxygen present in the reaction mixture is dependent on its partial pressure and solubility.

The reaction system may vary from an oxygen pressure of 0.05 atm. to 50 atm., preferably between 0.2 atm. and 5 atm. Especially in the case of less reactive mercaptans and olefins, it is necessary to use super atmospheric pressure. Oxygen may be introduced to a closed system through valves, but the simplest way is to supply it through an inductor into the liquid reaction mixture. In the case of the olefin-mercaptan co-oxidation, temperatures may range from about —50° C. to 0° C. At such temperature ranges the hydroperoxide reaction products can be isolated.

The hydroperoxides produced by this invention decompose at various temperatures depending upon their individual structures. By selecting suitable mercaptan and olefin reactants, it is possible to prepare hydroperoxides which are stable at relatively high temperatures. A few representative reactions of this co-oxidation process are shown in Table I.

TABLE I

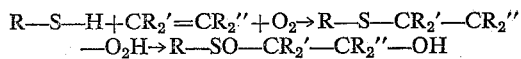

| Starting materials | | | Hydroperoxide |
|---|---|---|---|
| Olefinic compound | Mercaptan | Oxygen | |

*Table I—Continued*

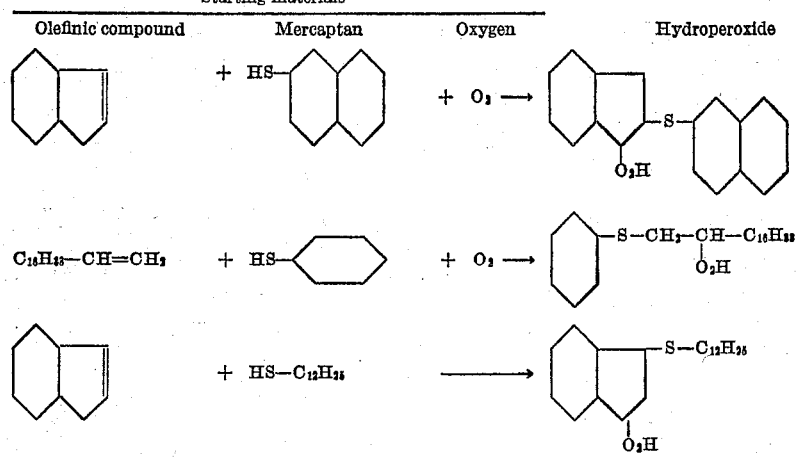

The co-oxidation of mercaptans with diolefins to produce hydroperoxide compounds is a further advantage in this invention because of the great ease and rapidity at which the reaction proceeds. The suggested reaction mechanism for the co-oxidation of mercaptans with conjugated diolefins is as follows:

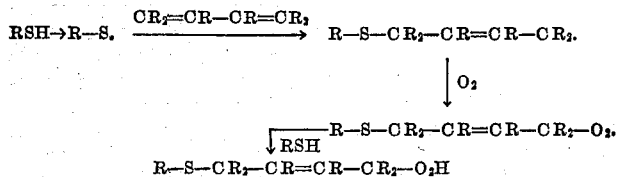

The formation takes place so readily and simply from petrochemical raw materials as to offer an important advantage over common organic peroxides which are prepared only with great difficulty. It is usually preferable to keep the reaction mixture below room temperature to avoid decomposition of the hydroperoxide reaction products.

The molar ratios of the reactants, diolefins, mercaptans and oxygen can be varied considerably. The mercaptan-diolefin ratio is 0.0001–10 preferably 0.001–2. A small mercaptan-diolefin ratio can be especially useful, when the hydroperoxide formed is used for the in situ polymerization of the diolefin excess. The ratio of oxygen is again dependent on the partial pressure of oxygen, which varies between 0.01–50 atm., preferentially between 0.1 and 3 atms. In the case of the very reactive conjugated diolefins the use of a pressure greater than 1 atm. is never necessary. The simplest way to supply oxygen is by bubbling it through an inductor into the liquid reaction mixture.

The ease of formation of free radicals makes the hydroperoxides produced according to this embodiment of the invention uniquely suitable as catalysts for a low temperature polymerization. Also, they can be used as curing agents, reactants for the removal of pyrrole-type compounds from petroleum, monomers for manufacturing plastics, and as a starting material for a variety of chemical syntheses.

Representative reactions are as follows:

TABLE II

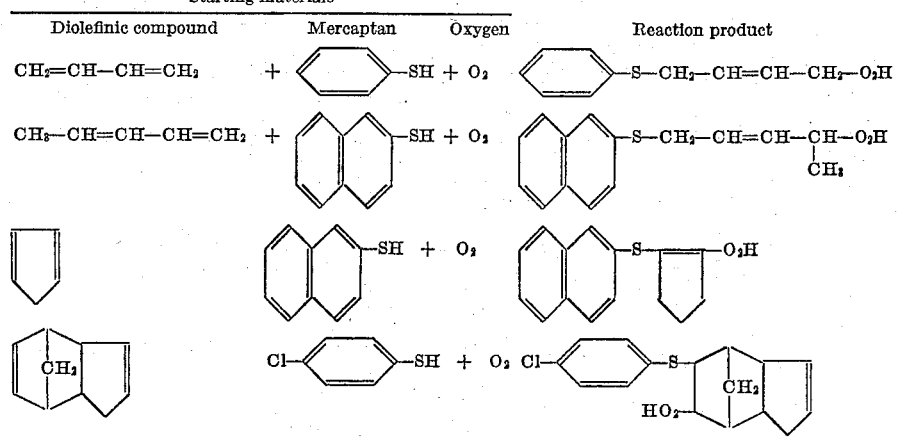

In a further embodiment of the invention, it has been found that the co-oxidation of mercaptans with olefins or diolefins can be catalyzed by agents abstracting hydrogen from mercaptans. This abstraction results in the formation of mercapto radicals which start the co-oxidation chain. The use of such chain initiators, e.g. ultraviolet light, peroxide compounds, is especially important when aliphatic mercaptans or n-olefins are co-oxidized. In the absence of such catalysts, some co-oxidation reactions have extremely long induction periods and are not practical to carry out because of sluggishness of the reaction. In the presence of ultraviolet irradiation or a peroxide catalyst, suitable initiation can be effected within a few hours, and the reaction can be completed in a few days at room temperature.

As suitable catalyst a 250 v., 100 w., 60 cycle ultraviolet lamp can be used. For instance, this lamp may be placed about 1 inch from a 500 ml. quartz reaction bottle. Gamma irradiation can also catalyze such co-oxidation. It is usually enough to use irradiation only during the first half hour of the reaction. Among the peroxide initiators of the reaction, hydroperoxides, such as t-butyl hydroperoxide, cumene hydroperoxide, and (2-hydroperoxy-2-phenyl-) ethyl phenyl sulfide, are especially suitable to use. Such hydroperoxide catalysts may be prepared from reactive hydrocarbons (and mercaptans) in situ. If they are added to the reaction mixture, their amount varies from 0.5 to 0.0001 mole preferably from 0.1 to 0.001 mole per mole of mercaptan or olefin.

The mercaptans of this reaction may be represented by the general formula RSH wherein R is a hydrocarbon radical containing from $C_2$ to $C_{32}$ carbon atoms, preferably from $C_2$ to $C_{18}$. These hydrocarbons include aromatic and aliphatic groups which may be defined as follows.

The term "aromatic mercaptan" shall be interpreted to include both a non-substituted aromatic mercaptan and a halogen-substituted aromatic mercaptan where one or more halogen atoms are substituted for hydrogen atoms connected to a carbon atom of the aromatic ring. In the case of aliphatic mercaptans R is an open chain radical.

The olefins may be represented by the general formula $CRR'=CR''R'''$ where R, R', R'' and R''' are hydrogen, cyclic or aliphatic hydrocarbon radicals.

"Cyclic" include radicals wherein a ring structure is present. The aliphatic radical includes saturated open chain hydrocarbon radicals, such as n-hexadecyl.

The diolefins may be represented by the general formula $CRR^1-CR^2-X-CR^3=CR^4R^5$ where R, $R^1$, $R^2$, $R^3$, $R^4$ and $R^5$ is hydrogen, cyclic or aliphatic hydrocarbon radicals; X is non-existent or a two valent, cyclic or aliphatic hydrocarbon radical. R, $R^1$, $R^2$, $R^3$, $R^4$ and $R^5$ can be satisfied, e.g. by cyclohexyl and methyl groups. X can be methylene, tetramethylene, cyclohexylene, and their substituted derivatives.

To more fully illustrate the invention, the following examples are given:

EXAMPLE 1

The general procedure in this series of experiments was to mix an olefin and a mercaptan in a diluent. Air was

TABLE III

| Reactants | | | | Diluent | | Reaction time, hrs. | Reaction product precipitated [5] | | |
|---|---|---|---|---|---|---|---|---|---|
| Olefin | | Mercaptan | | | | | | | |
| Name | Mole | -Thiol | Mole | Name | Ml. | | Name | Yield, Percent [6] | Peroxide content, Percent [6] |
| Indene | 0.1 | 2-naphthalene | 0.1 | n-Heptane Benzene | 300 125 | 2 | 2-(1-hydroperoxy-)indanyl 2-naphtyl sulfide. | 19.5 | [1] 98 |
| Do | 0.05 | Benzene | 0.05 | n-Heptane | 150 | 5 | 2-(1-hydroperoxy-)indanyl phenyl sulfide. | 25 | [2] 12 |
| Styrene | 0.05 | do | 0.05 | do | 150 | 5 | (2 - hydroperoxy - 2 - phenyl -) ethyl phenyl sulfide. | 32.5 | [2] 10 |
| α-Methylstyrene | 0.1 | 2-naphthalene | 0.2 | n-Heptane Benzene | 300 50 | 6.5 | (2 - hydroperoxy - 2 - phenyl -)propyl 2 - naphthyl sulfide. | [7] 16 | [1] 81, [2] 2 |
| Do | 0.05 | 4-chlorobenzene | 0.05 | Petroleum dist.[3] | 300 | 20 | (2 - hydroperoxy - 2 - phenyl -) propyl 4-chlorophenyl sulfide.[4] | 67 | [2] 30 |
| Do | 0.05 | Benzene | 0.05 | do.[3] | 300 | 20 | (2 - hydroperoxy - 2 - phenyl -) propyl phenyl sulfide. | 42.5 | [2] 18 |

[1] Iodine method.
[2] Ferrous sulfate titanous chloride method.
[3] Boiling range 300° to 600° F.
[4] Upon standing at room temp. converted to a white cryst. solid-(2-hydroxy-2-phenyl-) propyl 4-chlorophenyl sulfoxide.
[5] All reaction products were colorless, viscous, oil products at room temperature except 2-(1-hydroperoxy)-indanyl 2-naphthyl sulfide, which was a white crystalline solid melting with decomp. at 70° C.
[6] Percent of the calculated value for the hydroperoxide co-oxidation product.
[7] Precipitated by cooling the solution to −5° C.

then introduced into the mixture through a sintered glass inductor while the solution was cooled in ice to 0° C. Where the reaction temperature was other than 0° C., the table below so indicates. By the end of the oxidation period, the reaction product separated on the bottom of the reaction flask. The reaction product was analyzed for hydroperoxide content after isolation. The results are shown in Table III.

This table shows the reaction of olefins with mercaptans typical of this invention.

EXAMPLE 2

The following table illustrates the reaction of diolefins and mercaptans in accordance with the invention. Unless otherwise indicated, the reaction was carried out at 0° C. In all cases, air was used as the oxidizing agent and was introduced through a sintered glass inductor. The products of conjugated diolefin mercaptan co-oxidation separated as almost colorless viscous oils and were analyzed for peroxide content by the iodine method. The results are shown in Table IV.

TABLE IV

| Run No. | Reactants | | | | n-Heptane diluent (ml.) | Reaction time (Hrs.) | Ppt. temp. (° C.) |
|---|---|---|---|---|---|---|---|
| | Diene | | Mercaptan | | | | |
| | Name | Mole | -Thiol | Mole | | | |
| 1 | 1,3-butadiene | 0.2 | Benzene | 0.1 | 60 | 4 | 0 |
| 2[1] | do | Excess | do | 0.1 | 100 | 5 | 0 |
| 3 | Piperylene | 0.2 | 2-Naphthalene | 0.1 | 200 | 16 | 0 |
| 4 | Cyclopentadiene | 0.2 | do | 0.1 | 300 | 16 | 0 |
| 5 | Dicyclopentadiene | 0.1 | 4-Chlorobenzene | 0.1 | 300 | 6 | 0 |
| 6[5] | | 0.1 | | 0.1 | 300 | 16 | 20 |
| 7[4] | | 0.05 | | 0.1 | 300 | 16 | 20 |
| 8 | | 0.1 | | 0.1 | 300 | 16 | 0 |

| Run No. | Reaction product | Yield | | Peroxide content, percent | Isomer M.P. (° C.) | Carbon | | Hydrogen | | Sulfur | |
|---|---|---|---|---|---|---|---|---|---|---|---|
| | | Percent | Grams | | | Calcd. | Found | Calcd. | Found | Calcd. | Found |
| 1 | 1-hydroperoxy-4-phenyl mercapto-2-butene | 40 | 8 | 4 | | 61.20 | 61.54 | 6.15 | 6.23 | 16.3 | 14.8 |
| 2 | do | 41 | 8.2 | | | | | | | 16.3 | 14.9 |
| 3 | 1-hydroperoxy-4, 2'naphthyl-mercapto-2-pentene | 77 | [2]20 | 19.6 | | 69.20 | [6]65.68 | 6.20 | 6.21 | 12.31 | [6]11.1 |
| 4 | 2-hydroperoxy-4-2'naphthyl mercapto-2-cyclopentene | 73 | [2]19 | 19 | | 69.74 | 67.40 | 5.46 | 5.91 | 12.41 | 11.4 |
| 5 | 4,7 - methylene - 5,2' - naphthyl - mercapto - 6 -hydroperoxy-4,5,6,7,8,9-hexahydroindene | 48 | 14.7 | [3]12 | a210-2 a203-5 185-7 | 62.20 | 62.37 | 5.55 | 5.58 | 10.39 | 10.25 |
| 6 | do | 33 | 10.2 | 12 | a210-2 a203-5 185-7 | | 61.85 | | 5.63 | | 10.25 |
| 7 | do | | 10.2 | 12 | a210-2 a203-5 185-7 | | 60.82 | | 5.53 | | 10.46 |
| 8 | do | | 20.8 | 12 | a210-2 a203-5 185-7 | | | | | | | a Decomposed.
[1] Air and butadiene introduced at about equimolar rates into thiophenol-heptane solution.
[2] After washing with n-heptane.
[3] Decreased 5.5% after 2-mo. standing at room temp.
[4] Reaction at room temperature.
[5] Water cooled during first two hours to maintain room temperature.
[6] The lower than theoretical carbon and sulfur values suggest some peroxidation of diolefin alone.

It will be noted from run 7 on the above table that an attempt to co-oxidize one mole of dicyclopentadiene with two moles of 4-chlorothiophenol failed. This shows that the second double bond of the diolefin is less reactive. 3.6 grams of the 4-chlorothiophenol were unchanged on the basis of a mercaptan number determination. The co-oxidation product precipitate contained only one mole of mercaptan per mole of dichloropentadiene: a product identical with that obtained in run 6.

The following examples indicate the efficacy of ultraviolet light as a catalyst in the co-oxidation reaction.

EXAMPLE 3

20.2 grams (0.1 mol) of n-dodecyl mercaptan and 10.4 grams (0.1 mol) of styrene were dissolved in 150 ml. n-heptane in a 500 ml. Vycor (quartz) bottle. The solution was placed about 1 inch away from an ultraviolet lamp (250 v., 100 w., 60 cycle; G.E.-9T64Y20) and air was introduced through a fine sintered glass gas inductor during irradiation. A half hour after the introduction of air, the precipitate formed in the solution was filtered off. 4.5 grams, i.e. 18.7% crystalline substance was obtained. This substance contains 12% peroxide (calculated for 2-phenyl-2-hydroperoxy-ethyl n-dodecyl sulfide). The introduction of air into the filtrate was continued for another 6 hours. This resulted in the formation of more crystalline precipitate. By repeated filtration another 12 grams, i.e. a yield of 50% product was obtained. This was recrystallized from benzene/n-heptane mixture and gave 9 grams of purified 2-phenyl-2-hydroxy-ethyl n-dodecyl sulfoxide, M.P. 107–109° C. The following values were found after elemental analyses: C, 70.50; H, 10.75; S, 8.9. The calculated values for $C_{20}H_{33}SO_2$ are the following: C, 70.95; H, 10.12; S, 9.47.

The mother liquor from the second filtration was cooled in a solid carbon dioxide-methanol bath and filtered again. About 2.5 grams, i.e., a yield of 10.4% white crystalline product remained on the filter. After recrystallization from benzene-n-heptane, the purified product was found to melt at 66–69° C. An elemental analysis revealed the following: C, 70.37; H, 10.31; S, 9.1. The co-oxidation reaction described in the example proceeds through an unstable peroxide intermediate and gives a mixture of crystalline isomeric 2-phenyl-2-hydroxy-ethyl n-dodecyl sulfoxides in 79.1% overall yield. In a control solution unexposed to ultraviolet light, no hydroxy-sulfoxide precipitate was formed during the same period of air introduction.

EXAMPLE 4

11.6 grams (0.1 m.) indene and 20.2 grams (0.1 m.) n-dodecyl mercaptan were dissolved in 300 ml. n-heptane. Air was introduced into the solution which was placed into a 500 ml. Vycor (quartz) round bottom flask and irradiated with an ultraviolet lamp (250 v., 100 w., 60 cycle—G.E.-9T64Y20) at a half inch distance. After one day, an orange reaction mixture resulted which on one more day air introduction without ultraviolet light deposits 14.7 g., i.e. 42% product. This product had 3% peroxide content of the 2-(1-hydroperoxy)–indanyl dodecyl sulfide. On recrystallization of the product the peroxide content disappeared and the isomeric 2-(1-hydroxy)-indanyl dodecyl sulfoxides shown at No. 16 in Table V.

TABLE V

*Hydroxysulfoxide Conversion Products of Hydroperoxides*

| No. | Structural Formula | Melting point, °C. | Carbon Calc'd. | Carbon Found | Hydrogen Calc'd. | Hydrogen Found | Sulphur Calc'd. | Sulphur Found |
|---|---|---|---|---|---|---|---|---|
| 1 | C$_6$H$_5$–S(O)–CH$_2$–CH(OH)–C$_{10}$H$_{21}$ | 67 – 68 | 69.67 | 69.49 | 9.71 | 9.70 | 10.3 | 10.0 |
| 2 | C$_6$H$_5$–S(O)–CH$_2$–CH(OH)–C$_{16}$H$_{33}$ | 51 – 52 | 73.24 | 73.68 | 10.66 | 10.65 | 8.1 | 8.0 |
| 3 | H$_3$C–C$_6$H$_4$–S(O)–CH$_2$–CH(OH)–C$_{16}$H$_{33}$ | 60 – 62 | 73.53 | 73.88 | 10.78 | 10.95 | 7.84 | 7.7 |
| 4 | naphthyl–S(O)–CH$_2$–CH(OH)–C$_{16}$H$_{33}$ | 88 – 90 | 76.01 | 75.90 | 9.95 | 10.10 | 7.2 | 7.0 |
| 5 | Cl–C$_6$H$_4$–S(O)–CH$_2$–CH(OH)–C$_{16}$H$_{33}$ | 65 – 66.5 | 67.14 | 66.86 | 7.47 | 8.1 | 8.26 | 7.6 |
| 6 | C$_6$H$_5$–CH(OH)–CH$_2$–S(O)–C$_6$H$_5$ | 123 –130 | 68.26 | 68.46 | 5.73 | 5.42 | 13.0 | 12.6 |
| 7 | C$_6$H$_5$–CH(OH)–CH$_2$–S(O)–naphthyl | 145 –147 | 72.97 | 72.66 | 5.40 | 5.40 | 10.8 | 10.5 |
| 8 | C$_6$H$_5$–CH(OH)–CH$_2$–S(O)–C$_{12}$H$_{25}$ | 107 –109<br>66 – 69 | 70.95 | 70.50<br>70.37 | 10.12 | 10.75<br>10.31 | 9.47 | 8.9<br>9.1 |
| 9 | C$_6$H$_5$–CH(OH)–CH$_2$–S(O)–C$_6$H$_4$–Cl | 156.5–158.5<br>86 – 88 | 61.12 | 60.77<br>61.10 | 5.09 | 5.35<br>5.28 | 10.88 | 10.5<br>10.4 |
| 10 | C$_6$H$_5$–C(CH$_3$)(OH)–CH$_2$–S(O)–naphthyl | 114 –118 | 73.52 | 72.8 | 5.84 | 5.85 | 10.3 | 10.2 |
| 11 | C$_6$H$_5$–C(CH$_3$)(OH)–CH$_2$–S(O)–C$_{12}$H$_{25}$ | 47.5– 48.5 | 71.52 | 71.97 | 10.30 | 10.55 | 9.1 | 8.8 |
| 12 | indanyl(OH)–S(O)–C$_6$H$_5$ | a 158 –159<br>132 –135<br>148 –150 | 69.77 | 69.69<br>69.82<br>69.81 | 5.46 | 5.68<br>5.82<br>5.66 | 12.39 | 10.7<br>9.0<br>9.8 |
| 13 | indanyl(OH)–S(O)–C$_6$H$_4$–CH$_3$ | a 166.0–167.5<br>139 –144.5<br>127 –130 | 70.59 | 69.76<br>70.36<br>70.55 | 5.88 | 5.85<br>6.16<br>6.21 | 11.76 | 10.2<br>10.7<br>10.4 |
| 14 | indanyl(OH)–S(O)–C$_6$H$_4$–Cl | 144 –146 | 61.53 | 60.95 | 4.47 | 4.62 | 10.95 | 10.5 |
| 15 | indanyl(OH)–S(O)–naphthyl | 149 –150<br>a 138 –141<br>a 125 –127 | 73.99 | 73.66<br>74.26<br>73.25 | 5.23 | 5.32<br>5.48<br>5.29 | 10.40 | 10.3<br>10.4<br>9.9 |

See footnote at end of table.

TABLE V—Continued

| No. | Structural Formula | Melting point, °C. | Carbon | | Hydrogen | | Sulphur | |
|---|---|---|---|---|---|---|---|---|
| | | | Calc'd. | Found | Calc'd. | Found | Calc'd. | Found |
| 16 | (cyclohexyl-indanyl)-S(=O)-C₁₂H₂₅ with OH | 107–109 67–68.5 | 71.95 | 69.85 71.73 | 9.77 | 9.59 9.53 | 9.15 | 9.6 9.3 | a Decomposed.

EXAMPLE 5

25.2 grams (0.1 m.) 1-n-octadecene and 11.0 grams (0.1 m.) thiophenol were co-oxidized by air in heptane solution in a manner described in the previous example. After four hours' irradiation and a total of twenty hours of air introduction, half of the original amount of mercaptan had been converted according to mercaptan number determination. Eight grams, i.e. a yield of 20.3% of a product containing 3% peroxide, was removed by filtration. On recrystallization the peroxidic product was converted to isomeric 2-hydroxy-octadecyl phenyl sulfoxides with properties shown at No. 2 in Table V. Further introduction of air into the once filtered mixture resulted in the precipitation of more co-oxidation product. No solid co-oxidation product was formed in a parallel co-oxidation experiment carried out without ultraviolet initiation.

EXAMPLE 6

13.2 grams (0.1 mol) dicyclopentadiene and 20.2 grams (0.1 mol) of n-dodecyl mercaptan were co-oxidized in n-heptane solution with air in the usual manner for 1 day. After this period, a mercaptan number determination showed only 5% mercaptan conversion. When another mixture of the same composition was irradiated with an ultraviolet lamp (250 v., 100 w., 60 cycle—G.E.– 9T64Y20) at ½ inch distance while air was introduced into it, 85% mercaptan conversion was achieved after the same reaction time. A liquid co-oxidation product with a light yellow color remained after the solvent was removed by distillation.

The following two examples are illustrative of the efficacy of added hydroperoxide catalysts in the co-oxidation reaction.

EXAMPLE 7

10.4 grams (0.1 mol) styrene and 20.2 grams (0.1 mol) n-dodecyl mercaptan were dissolved in 300 ml. n-heptane. The solution was placed into a 500 ml. measuring cylinder and air was introduced into it for 12 days. Immediately after the start of the air introduction, 0.18 gram (0.002 mol) t-butyl hydroperoxide was added to the reaction mixture as a catalyst. From time to time, the n-heptane evaporated was replaced. At the end of the 12-day reaction period, a mercaptan determination on a filtrate sample showed only 0.002 mol unconverted mercaptan sulfur. By filtration of the heterogeneous mixture, 23.9 grams (70.7%) white, solid peroxidic product was obtained. According to a hydroperoxide determination by the sodium iodide method, this product was 14% of the peroxide content calculated for the (2-hydroperoxy-2-phenyl)-ethyl dodecyl sulfide. By cooling the filtrate to −15° C. and subsequent filtration, 3.3 g. (8.9%) more solid, peroxidic product was obtained. On recrystallization, the product yielded the peroxide free isomeric (2-hydroxy-2-phenyl)-ethyl dodecyl sulfoxides shown at No. 8 in Table V.

EXAMPLE 8

11.8 grams (0.1 mol) α-methyl styrene and 20.2 grams n-dodecyl mercaptan were dissolved in 300 ml. n-heptane. The solution was aerated as in the previous example. After 24 hours' air introduction, the mixture contained only 0.004 mol mercaptan, i.e. 4% of the original but 0.02 mol hydroperoxide. After removal of the n-heptane solvent, 31.3 grams of a colorless liquid remained, which had the following composition: C, 68.69; H, 11.29; S, 10.0 The calculated composition of (2-hydroperoxy-2-phenyl)-propyl dodecyl sulfide is: C, 71.52; H, 10.30; S, 9.1. The peroxidic product yielded (2-hydroxy-2-phenyl)-propyl dodecyl sulfoxide shown at No. 11 in Table V on low temperature crystallization.

As it was mentioned, the primary products of such reactions are new hydroperoxides. It is well known that hydroperoxides generally can be used as polymerization catalysts. In this respect, these new hydroperoxides can have new applications for vulcanization of rubber or similar products because of their sulfur and olefin content.

The hydroxysulfoxide secondary products of dicyclopentadiene mercaptan co-oxidations are potential petroleum additives, antistatic agents and pesticides depending on the type of mercaptan and dicyclopentadiene used in the reaction.

The following two examples show the use of the hydroperoxide products in accordance with the invention in radical polymerization.

EXAMPLE 9

0.3 grams (0.001 mol) of 2-(1-hydroperoxy)-indanyl 2-naphthyl sulfide prepared by the method given in run No. 1 of Example 1 was added to 34.6 grams (0.3 mol) of styrene as a polymerization catalyst. The mixture was then placed into a cold box at +5° C. for 3 months. At the end of this period, the mixture was a very viscous liquid with a refractive index, $n_D^{20}$ 1.5584. On distillation at 20 mm. from a steam bath, only 75% of the material could be removed. The remaining 25% is a solid, rubbery substance, polystyrene. Styrene without added hydroperoxide in a control experiment had $n_D^{20}$ 1.5468 and could be distilled under the same circumstances in 99%.

EXAMPLE 10

0.5 gram of the product of 1,3-butadiene co-oxidation shown in run No. 1 of Example 2 was dissolved in 30 grams of styrene. The solution was stored in an airtight bottle of about 35 ml. volume for two weeks at room temperature. The resulting viscous liquid was distillated at 10 mm. pressure from a water bath. 5.8 grams of white, solid polymer remained. This means that 5.3 grams, i.e. 17.6% of the styrene was polymerized. A control experiment with styrene alone gave only 0.05 gram of residue on distillation.

It can be seen from these two examples that these new sulfur containing hydroperoxide catalysts are particularly advantageous for inducing low temperature polymerization between −60 and +70° C. The quantity of these catalysts may vary from 0.0001 mol to 0.1 mol per mole of olefinic compound to be polymerized. It was already mentioned in Examples 3, 4, and 5 that the hydroperoxides of the co-oxidation reaction gave hydroxysulfoxides on recrystallization. The use of hydroperoxides as a chemical intermediate for the preparation of hydroxysulfoxides is shown in the following examples.

EXAMPLE 11

3.18 grams (0.01 mol) of 2-(1-hydroperoxy)-indanyl 2-naphthyl sulfide were dissolved in 50 mls. of benzene. The hydroperoxide was prepared in accordance with run No. 1 of Example 1. The solution was kept 16 hours at 43° C. and then allowed to cool to room temperature. The precipitate formed was vacuum filtered and recrystallized from benzene. About 1.5 grams or a yield of 47.1% of 2-(1-hydroxy)-indanyl 2-naphthyl sulfoxide as a white crystalline substance was obtained. A melting point of 138-141° C. with decomposition was observed. By the concentration of the benzene filtrate other crystalline 2-(1-hydroxy)-indanyl 2-naphthyl sulfoxide isomers can be obtained. Analytical data for these different isomers are shown at No. 15 in Table V.

Some physical and analytical data of other new hydroxyethyl-sulfoxides prepared by heating the corresponding hydroperoxides in benzene solution on a steam bath are shown in Table V.

The removal of dienes from steam cracked naphtha by co-oxidation is also contemplated by this invention. The following example illustrates this.

EXAMPLE 12

16 grams (0.1 mol) 2-naphthalene thiol were dissolved in 100 mls. (82 grams) steam cracked naphtha of diene number 34. Air was introduced into the solution at room temperature for three hours. After three hours, the solution was cooled down to 0° C. and the air introduction was continued for another 3 hours. At the end of this period, the clear, orange colored reaction mixture was placed into a cool box at $-15°$ C. At this temperature an almost colorless solid precipitated. It was filtered off by suction and washed by cold n-heptane. In this manner, 0.4 gram of substance resulted, which had a high peroxide content (peroxide equivalent 242). The filtrate (653 grams) has been diluted with an equal volume of n-heptane, when 24 grams of orange colored co-oxidized product separated as a bottom phase at room temperature. The latter product had a peroxide equivalent to 393. The diene number of the steam cracked naphtha decreased to one-third of the original as a result of the treatment.

In another experiment, a steam cracked naphtha of 14 diene number was treated in the presence of 2-naphthalene thiol in the presence of oxygen in a similar manner. After the treatment, a product of 1.6 diene number was obtained after distillation.

It is noted that with the clay treatment, which is usually used for the removal of dienes from steam cracked naphthas, only about 50% reduction in diene number was obtained.

Co-oxidation reactions for the removal of reactive olefins and/or mercaptans can be carried out in other petroleum fractions in similar manner. Depending on the composition of the particular fraction diolefin or mercaptan can be added to achieve about an equimolar concentration of the reaction components.

Hydroperoxides with suitable alkyl substituents can be converted to surface active agents by the following sequence of reactions:

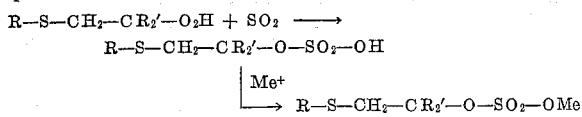

$Me^+$: metal cation as $Na^+$, $K^+$, $Li^+$, $Ca^{++}$, $Ba^{++}$, $Pb^{++}$, etc. in the form of a metal oxide or hydroxide or a base, e.g. an amine as triethanolamine and the like.

Hydroperoxides containing sulfur in a divalent form are generally not stable enough for isolation. Another feature of the present invention overcomes that difficulty. Sulfuric acid half esters can be prepared by adding sulfur dioxide or a suitably acidic sulfur dioxide salt (e.g. sodium hydrogen sulfite, formaldehyde sodium sulfoxilate) to the co-oxidation mixture. The sulfur dioxide or its derivative can be added to the liquid reaction mixture of olefin, mercaptan and possibly solvent before the addition of oxygen or simultaneously with oxygen. The simultaneous introduction of sulfur dioxide gas and air is preferred. Another preferable arrangement is the introduction of air into an emulsion consisting of the hydrocarbon solution of the mercaptan and olefin and water solution of sodium bisulfite. In the latter manner, the sulfuric acid half ester sodium salt is obtained in a one-step operation according to the following summarized equation:

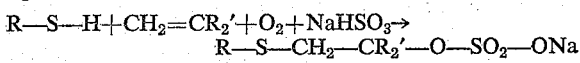

Generally speaking, the presence of an alkyl radical having from 6-30 carbon atoms is necessary in the surface active molecules. Such surface-active compounds can be used as detergents, emulgents, impregnates, dispersants, solubilizers, wetting agents and foam producers.

The following examples show the preparation of surface-active compounds.

EXAMPLE 13

10.4 grams (0.1 m.) styrene and 20.2 grams (0.1 m.) n-dodecyl mercaptan were dissolved in 300 ml. n-heptane. The solution was placed into a 500 ml. measuring cylinder and oxygen and sulphur dioxide were introduced into it at the same time for three hours while cooling it with ice water. After three hours 7.5 g. (18.6%) yellow oily product separated on the bottom of the reaction mixture. The supernatant hexane solution deposited 5 g. (12.4%) more oil on cooling to $-15°$ C.

The united oily fractions were washed by n-heptane, freed from volatile components in a vacuum desiccator and analyzed. The following composition was revealed: C, 56.36; H, 8.09; S, 12.93. The calculated values for (2-phenyl-1-dodecylmercapto)-ethyl alcohol sulphuric acid half ester are: C, 59.66; H, 8.51; S, 15.93.

EXAMPLE 14

10.4 grams (0.1 m.) styrene and 20.2 grams n-dodecyl mercaptan were dissolved in 300 ml. n-heptane. The solution was placed into a 1 liter measuring cylinder and solution of 9.1 grams (0.05 m.) $Na_2S_2O_7$ in 200 ml. water was added to it. Air was introduced into the two-phase system at room temperature. Within a few minutes after the start of air introduction, an emulsion with a tendency to foam was formed. After three days' air introduction, a mercaptan number determination showed a 50% conversion and a stable emulsion was obtained.

The emulsion was broken by the addition of 50 ml. alcohol and the reaction mixture was separated in two phases. The water phase was concentrated in vacuum by heating with a steam bath and left 20.2 g. of the solid emulgent containing (2-phenyl-1-dodecyl-mercapto)-ethyl alcohol sulfuric acid half ester sodium salt.

The hydroxy group of the hydroxysulfoxides can be also esterified with sulfuric acid ($SO_3$) and the half ester can be converted to a salt to give a detergent. An illustrative example of such a reaction is described in Example 15.

EXAMPLE 15

6.76 grams (0.02 mol) of 2-phenyl-2-hydroxy-ethyl n-dodecyl sulfoxide (alternative name (2-dodecylsulfinyl-2-phenyl)-ethanol), 5 grams (0.224 mol) of sodium pyrosulfate and 1.77 grams (0.0224 mol) pyridine were mixed in a round bottom flask. Then the contents were heated on a water bath and stirred effectively until a product soluble in warm water resulted. Consequently, 70 mls. of water and 18 grams of sodium chloride were added to the reaction mixture. The stirring was continued for another 1½ hours. Then the precipitated white, pasty product was filtered off and dried to give an almost white product with detergent properties. The product amounts to 8.6 grams, i.e. 96% yield calculated for $C_{18}H_{33}O_5S_2Na$ (2-dodecylsulfinyl-1-phenyl)-ethyl alcohol sulfuric acid monoester sodium salt.

The formation of a sulfuric acid half ester and its sodium salt from the hydroperoxide obtained by co-oxidation in coker gas oil is illustrated in the following two examples.

EXAMPLE 16

4 l. fresh untreated coker gas oil having 31.68 mercaptan number was placed into a 5 litre separating funnel. Air and sulfur dioxide were introduced into the solution at room temperature for 1½ hours. After 15 minutes of reaction time, a black oil began to separate from the oil. At the end of the reaction time, 8.7 g. sludge was separated. The analysis of this sludge revealed the following: C, 62.96; H, 7.86; S, 6.43; N, 3.05. (The oil had a mercaptan number of 10.56 after this procedure.) The high nitrogen content of the sludge shows that the acidic sulfuric acid half ester precipitated some nitrogen components of the oil. Therefore, the reaction is also useful for the removal of nitrogen from petroleum fractions.

EXAMPLE 17

3 litre coker gas oil (the same as in the previous experiment) and the solution of 34.6 grams $Na_2S_2O_7$ in 600 ml. water were placed into a 6 litre measuring cylinder. Air was introduced into the solution for 24 hours, while it was stirred by a magnet. At the end of the reaction period, the water phase was separated and the solvent evaporated. The remaining solid consists of a mixture of unchanged sodium bisulfite and the half ester salt. An analysis of that solid revealed 5.91% carbon content, which shows some reaction with the oil, although to a limited extent.

What is claimed is:

1. A polymerization process which comprises polymerizing an olefin monomer polymerizable by free radicals in the presence of a hydroperoxide of general formula:

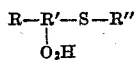

wherein R and R' together contain a total of 2 to 18 carbon atoms, R being selected from the group consisting of hydrogen, alkyl, alkenyl, cycloalkyl and cycloalkenyl radicals and R' being a $C_2$ to $C_{10}$ saturated hydrocarbon radical, and R" is selected from the group consisting of naphthyl and halogen-substituted aryl radicals, the hydroperoxy group and sulfur atom of said hydroperoxide being bonded to different carbon atoms of R'.

2. A method of preparing an organic sulfoxide having the formula

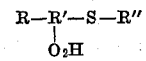

which comprises passing a gas comprising molecular oxygen through a solution of a sulfur containing organic hydroperoxide having the formula

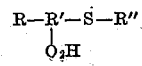

at a temperature in the range of from about −10 to 100° C. during a period of from about 5 minutes to 3 days, wherein R is selected from the group consisting of aryl, alkyl, cycloalkyl, alkaryl, and aralkyl; and R" is selected from the group consisting of an aromatic and aliphatic hydrocarbon radical, and R' is a $C_2$ to $C_{10}$ saturated hydrocarbon radical.

3. A method of removing a diene from a liquid hydrocarbon fraction containing a diene which comprises the introduction of from 0.01 to 1 mol of a mercaptan per diolefin into said hydrocarbon fraction, co-oxidizing said diene and mercaptan with molecular oxygen and separating out the reaction products from said oxidation.

4. A hydroperoxide having the general formula:

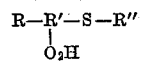

wherein R and R' together contain a total of 2 to 18 carbon atoms, R being selected from the group consisting of hydrogen, alkyl, alkenyl, cycloalkyl and cycloalkenyl radicals and R' being a $C_2$ to $C_{10}$ saturated hydrocarbon radical, and R" is selected from the group consisting of naphthyl and halogen-substituted aryl radicals, the hydroperoxy group and sulfur atom of said hydroperoxide being bonded to different carbon atoms of R'.

5. A process for producing a sulfur-containing hydroperoxide which comprises passing a gas containing molecular oxygen into a liquid reaction mixture containing a $C_2$ to $C_{18}$ hydrocarbon selected from the group consisting of aliphatic monoolefins, cycloaliphatic monoolefins, aliphatic diolefins, cycloaliphatic diolefins and indene and a $C_6$ to $C_{18}$ mercaptan selected from the group consisting of naphthyl and halogen-substituted aryl mercaptans while maintaining said reaction mixture at a temperature between −50° and 0° C.

6. A process in accordance with claim 5 wherein said gas is air.

7. A process in accordance with claim 5 wherein said liquid mixture is irradiated with ultraviolet light while said gas is passed thereinto.

8. A process in accordance with claim 5 wherein said liquid mixture contains a catalytic amount of an organic peroxide.

9. A hydroperoxide of the general formula:

wherein $HO_2$—X— is a 2-(1-hydroperoxy)indanyl radical, the sulfur atom being bonded to the 2-position of said radical. and R''' is a $C_2$ to $C_{18}$ alkyl radical.

10. A hydroperoxide of the general formula:

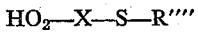

wherein $HO_2$—X— is a 2-(1-hydroperoxy)indanyl radical, the sulfur atom being bonded to the 2-position of said radical, and R'''' is a $C_6$ to $C_{18}$ aryl radical.

11. 2-(1-hydroperoxy)indanyl phenyl sulfide.

References Cited in the file of this patent

UNITED STATES PATENTS

| | | |
|---|---|---|
| 2,386,774 | Badertscher | Oct. 16, 1945 |
| 2,398,479 | Vaughan et al. | Apr. 16, 1946 |
| 2,515,120 | Harman | July 11, 1950 |
| 2,531,602 | Bell | Nov. 28, 1950 |